United States Patent [19]
Dulin

[11] 4,289,998
[45] Sep. 15, 1981

[54] SINGLE PHASE DC BRUSHLESS MOTOR

[75] Inventor: Gerald F. Dulin, Torrance, Calif.

[73] Assignee: Astronautics Corporation of America, Torrance, Calif.

[21] Appl. No.: 153,138

[22] Filed: May 27, 1980

[51] Int. Cl.³ .............................................. H02K 23/00
[52] U.S. Cl. .................................... 318/254; 318/138
[58] Field of Search ............... 318/254 A, 254 R, 138; 74/5.6 D, 5.6 E; 310/DIG. 3, 46

[56] References Cited
U.S. PATENT DOCUMENTS

| | | | |
|---|---|---|---|
| 3,230,434 | 1/1966 | Bauerlein | 318/138 |
| 3,299,335 | 1/1967 | Wessels | 318/138 |
| 3,331,005 | 7/1967 | Lear et al. | 318/254 |
| 3,548,223 | 12/1970 | Dittrich et al. | 310/46 |
| 3,559,014 | 1/1971 | Rakes | 318/254 |
| 3,603,161 | 9/1971 | Scharz | 318/254 |
| 3,707,638 | 12/1972 | Nailen | 318/138 |
| 3,716,769 | 2/1973 | Brunner | 318/254 A |
| 3,961,211 | 6/1976 | Vergues | 318/138 |

Primary Examiner—David Smith, Jr.
Attorney, Agent, or Firm—Ralph B. Pastoriza

[57] ABSTRACT

The single phase DC brushless motor is particularly useful as a gyro motor in a turn coordinator for aircraft. Essentially, the motor comprises a permanent ceramic rotor magnet with diametrically oppositely disposed stationary stator windings and a "Hall effect" sensor or Hall cell positioned adjacent to the rotor and responsive to the permanent magnet poles of the rotor to generate a commutating switching signal. The Hall cell is very economical to use and is capable of driving transistor switches directly for the stator windings without problems of extensive amplification and drift previously experienced. The immediate advantage of such a sensor is the complete elimination of brushes and conventional commutating bars and all of the attendant problems associated therewith. Cost savings are further realized by the use of bobbin wound coils for the stator windings rather than laying the windings into slots. Laminations are thus avoided and by the use of a ceramic rotor still further savings are achieved.

4 Claims, 2 Drawing Figures

SINGLE PHASE DC BRUSHLESS MOTOR

This invention relates generally to motors and more particularly to improved single phase DC brushless motors particularly useful as gyro motors in turn coordinators for aircraft.

BACKGROUND OF THE INVENTION

Electric motors generally are either AC or DC. Where a constant speed requirement exists, such as when a motor is to be used as a gyro in a turn coordinator, the AC motor has the advantage that by carefully regulating the alternating current frequency, use of a synchronous AC motor assures regulated speed. The major disadvantage of AC motors is that they are expensive. DC motors are not reliable with respect to regulating the speed and thus have limitations for use as gyro motors in turn coordinators. Further, all DC motors must have a commutating device in order to operate.

Heretofore, the commutating device for DC motors has been the major cause of problems. Brushes wear out, jam and spark. These problems are especially prevalent in very small motors which are run on an intermittent basis. An oxide layer formed on the commutator acts as a lubricant and normally extends the brush life. Intermittent service allows the oxide layer to break down, destroying the lubricating effect.

In an effort to avoid the need for brushes and commutator bars, photoelectric and magnetic commutating switching have recently become popular for use in DC motors. Such motors properly equipped with these types of commutating means have the same desirable torque-speed characteristics as a conventional DC motor. However, these new commutation schemes have been and are expensive.

The design of the DC motors themselves has involved the use of laminations for the windings and where the wires are laid into cavities in the laminations, the process is very expensive. In the case of a wound rotor, the wires must be very securely embedded to be sure that centrifugal force will not cause the windings to fly apart. Further, the rotor must be properly balanced to eliminate vibrations and slip rings must be used to connect the windings to the source of power.

BRIEF DESCRIPTION OF THE PRESENT INVENTION

With the foregoing considerations in mind, the present invention contemplates the provision of a DC motor which avoids the use of brushes, slip rings, stator coil laminations and the like all to the end that substantial savings can be realized in its manufacture and yet which is capable of highly accurate speed regulation, all to the end that it is ideally suited for use as a gyro motor in aircraft turn coordinators.

In its broadest aspect, the DC motor includes a permanent magnet rotor with stator windings adjacent to the periphery of the rotor. A Hall cell sensor means in turn is disposed adjacent to the rotor and stationary with respect thereto responsive to rotation of the rotor to provide a commutating signal for switching current passed to the stator windings in synchronism with the speed of the motor. Hall cell sensors have become extremely economical to use in recent years and are ideally suited for providing a proper switching signal in response to the change in the magnetic field as the north and south poles pass the sensor. Since there is no physical contact between the Hall cell sensor and the rotor, there are no problems of wear, sparking and the like as are associated with conventional brushes and commutator bars. In fact, the design of the present invention wholly eliminates the necessity for any slip rings and brushes.

In a preferred embodiment of the invention, the rotor is mounted in a gimbal which itself is mounted for turning movement about a gimbal at right angles to the axis of rotation of the rotor, the gimbal axis being coaxial with the stator windings so that magnetic flux interaction between the stator windings and the rotor is invariant with turning of the gimbal. As a consequence, the rotor can ideally function as a gyroscope.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
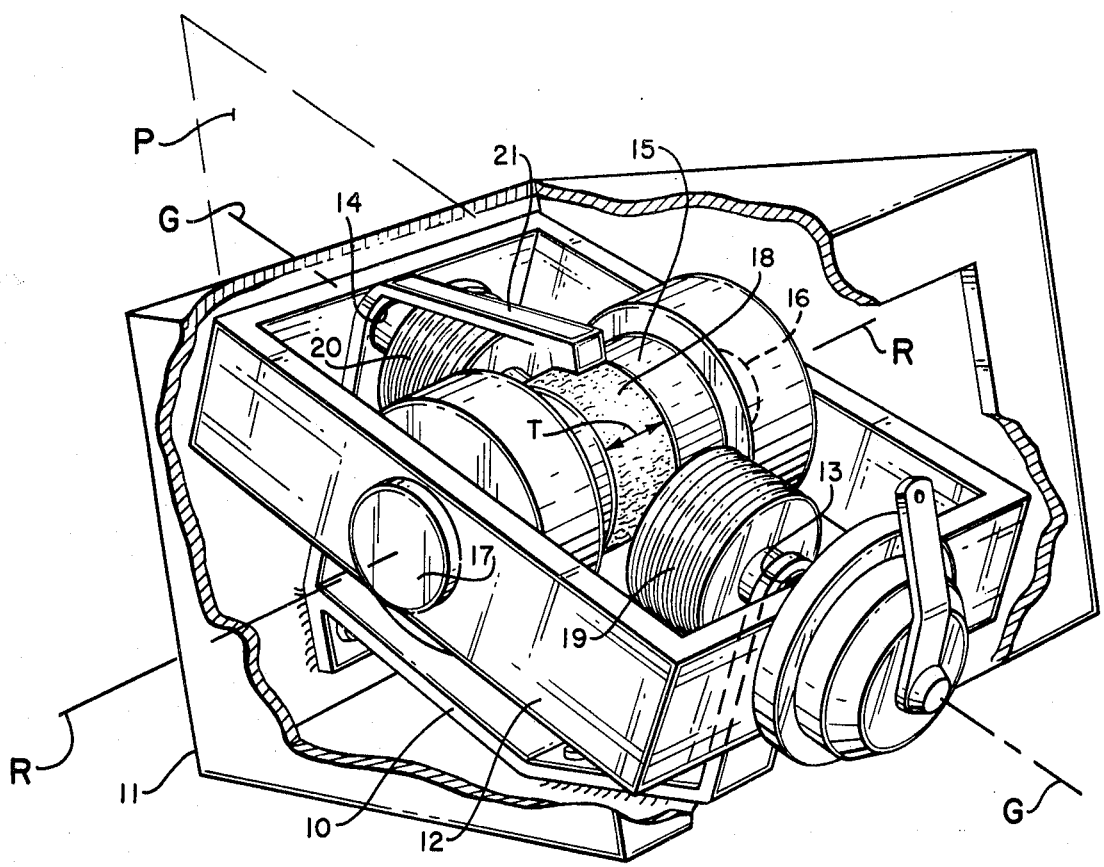
FIG. 1 is a cut-away perspective view of the single phase DC brushless motor of the present invention appropriately mounted for use as a gyro motor in an aircraft turn coordinator; and, FIG. 2 is a schematic electrical circuit diagram of the DC motor useful in explaining its operation.

Referring to FIG. 1, the single phase DC brushless motor of this invention is shown as a gyro motor mounted in an appropriate gimbal within a casing which comprises, by way of example, a turn coordinator for an aircraft.

More particularly, there is shown in the broken away portion of the casing a C-shaped frame or bracket 10 secured within the casing 11 and serving to mount the gimbal 12 for turning movement about an inclined gimbal axis G—G lying in a vertical plane P extending generally in a fore and aft direction. The fore and aft bearings for the gimbal 12 relative to the C-shaped frame 10 are indicated at 13 and 14. A gyro rotor 15 is, in turn, mounted in the gimbal as by bearings 16 and 17 for rotation about a transverse horizontal rotor axis R—R normal to the vertical plane P. As shown, rotor 15 includes a centrally disposed permanent ceramic rotor magnet 18 of given thickness T in an axial direction. As will become clear as the description proceeds, the ceramic rotor magnet 18 defines alternate north and south permanent magnetic poles about its periphery.

Still referring to FIG. 1, there are shown first and second stator windings 19 and 20 secured to the C-shaped frame 10 within the gimbal 12 but independent of the gimbal. These stator windings are juxtaposed to diametrically opposite sides of the ceramic rotor magnet 18 and are coaxial with the gimbal axis G—G. As a consequence, the magnetic flux interaction between the stator windings 19 and 20 and the ceramic rotor magnet is invariant with turning of the gimbal 12 and thus the rotor about the G—G axis.

Switching or commutation of the magnetic field by the stator windings 19 and 20 from current provided by an appropriate DC source is accomplished by a Hall cell sensor indicated at 21 supported by the frame 10 so as to be independent of movement of the gimbal 12. Sensor 21 is shown juxtaposed to the central peripheral portion of the ceramic rotor magnet 18. In this respect, the given thickness T of the rotor magnet is such that the degree of turning of the gimbal 12 in the frame 10 is not sufficient to remove the influence of the rotor magnet on the sensor 21.

The stator windings 19 and 20 can be bobbin wound and there are not required any laminations. This feature together with the use of a ceramic magnet for the rotor results in substantial savings in the cost of manufacturing the motor. In addition, and even more importantly, there is provision of the Hall cell sensor 21 for providing the commutating switching signal for current passed to the stator windings. This sensor wholly eliminates the need for brushes, commutator bars, slip rings and the like.

As mentioned heretofore, the Hall cell member is basically responsive to a magnetic field change to generate an appropriate electrical signal. Such cells have only recently been provided in an integrated circuit with an appropriate solid state amplifier at a relatively low cost and thus there is the double advantage of not only eliminating brushes and the like by utilizing the Hall cell but the fact that the same is available as an inexpensive component.

Figure 2:
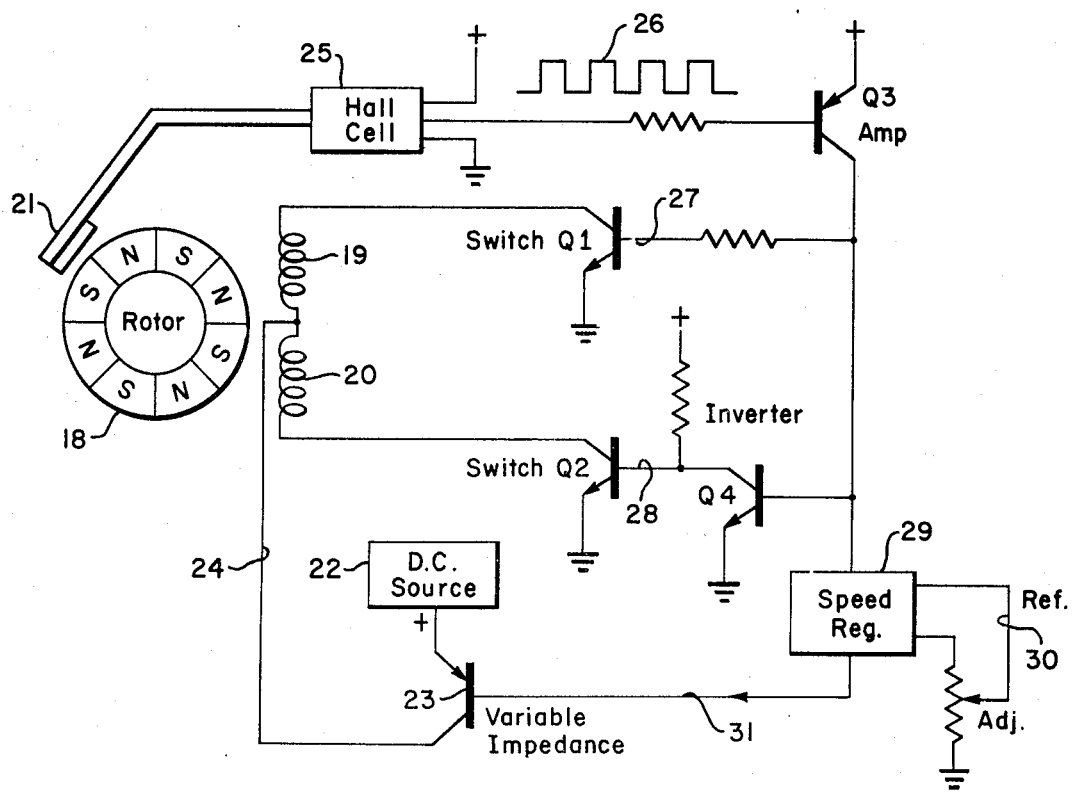

Referring now to FIG. 2, further details of the DC motor shown in FIG. 1 and its operation will become evident.

In the upper left portion of FIG. 2, there is schematically indicated the ceramic rotor magnet 18 wherein the alternate north and south poles are indicated by the letters N and S. The two field windings 19 and 20 are depicted by the same numerals in FIG. 2 in the schematic showing adjacent to the rotor 18.

Referring to the lower central portion of FIG. 2 an appropriate DC source is indicated at 22. This source will provide exciting current to the stator windings 19 and 20 but in the particular embodiment illustrated, there is provided a variable impedance 23 connected between the source and the windings. This variable impedance 23 has its output connected to lead 24 at a center common terminal for the stator windings 19 and 20. The outer ends of the stator windings 19 and 20 in turn pass through switching transistors Q1 and Q2 to a ground. It will be appreciated that if the transducers Q1 and Q2 are alternately switched on and off, the coils 19 and 20 will be alternately energized and de-energized.

Control of the switching transistors Q1 and Q2 is accomplished by the Hall cell sensor and circuit shown in the upper portion of FIG. 2.

More particularly, the pickup sensor 21 connects to the Hall cell shown by the block 25. As alternate north and south poles pass the sensor 21, the output of the Hall cell 25 is essentially a square wave depicted at 26. This square wave 26 is passed through a solid state amplifier Q3 which can constitute an integrated circuit with the Hall cell 25. The amplified square wave output is then passed directly to the base of the transistor Q1 as by lead 27 and to the base of an inverting transistor Q4. The output of the inverting transistor Q4 connects to the base by way of lead 28 of the transistor Q2. Since the transistor Q4 inverts the square wave, it will be appreciated that the signals on the base leads 27 and 28 are 180° out of phase with each other so that when the transistor Q1 is turned on, the transistor Q2 is turned off and vice versa.

The switching of these transistors is in synchronism with the speed of the rotor 18 since the switching signal is derived from the passing of the north and south poles beneath the sensor 21. By appropriate positioning of the stator windings 19 and 20, a consistent magnetic force is exerted on the rotor in one direction to continuously rotate the rotor in that direction.

The use of the Hall cell sensor provides an ideal signal not only for commutating purposes but also for appropriate speed regulation of the DC motor.

More particularly, and with reference to the lower right portion of FIG. 2, an appropriate speed regulation circuit is represented by the block 29 including a manually insertable adjustment value of desired speed at 30. Essentially, the block 29 receives the amplified output signal from the transistor Q3 and by any appropriate digital to analog converter provides an analog signal of magnitude corresponding to the frequency of the square wave output. In other words, the higher the frequency the greater will be the analog signal developed. This analog signal is in turn compared with the manually set in adjusted signal by the potentiometer tap 30 and any difference in the two signals results in an error signal. The error signal is passed along output line 31 to the variable impedance 23.

This error signal varies the impedance 23 to thereby vary the current passed to the stator windings. Increased current will speed up the motor while a decreased current will slow the motor down. Thus, the control is designed so that if the analog signal resulting from the output of the amplifier Q3 is greater than the reference adjusted input signal, the impedance 23 is increased to thereby decrease the current to the stator windings and thus slow the motor down until it reaches a speed corresponding to the manually set in adjusted value. If the analog signal from the output of the transistor Q3 is less than the manually set in adjusted value, the error signal developed will be of the opposite polarity and operate to lower the impedance 23 and thereby decrease the current to the stator windings to speed up the motor.

The foregoing is merely one example of an appropriate speed regulating system. It can be appreciated, however, that the precise square wave output from the integrated circuit made up of the Hall cell and amplifier Q3 is an ideal signal for purposes of speed regulation. In other words, precision speed control becomes very practical permitting the use of DC motors as opposed to AC motors heretofore deemed necessary for accurate speed control.

From all of the foregoing, it can be appreciated that the present invention has provided a greatly improved single phase DC motor wherein brushes and slip rings have been eliminated as well as laminations all to the end that great economy is realized in the manufacture without sacrifice of performance.

I claim:

1. A single phase DC brushless motor including, in combination:
   (a) a permanent magnet rotor made of ceramic material;
   (b) stator windings adjacent to the periphery of the rotor, said stator windings being bobbin-wound without laminations and stationarily positioned adjacent to diametrically opposite sides of the rotor;
   (c) a sole Hall cell adjacent to the rotor and stationary relative thereto responsive to rotation of the rotor to provide a commutating signal for switching current passed to the stator windings in synchronism with the speed of the rotor whereby slip rings and brushes are eliminated, and (d) a gimbal mounting the rotor for rotation, the gimbal being mounted for turning movement about a gimbal axis at right angles to the axis of rotation of the rotor, the gimbal axis being coaxial with the stator windings so that magnetic flux interaction between the stator windings and the rotor is invariant with turning of the gimbal, said Hall cell being positioned juxtaposed to a central portion of the rotor, the axial width of the ceramic material making up the permanent magnet being such that the degree of turning of the gimbal is not sufficient to remove the influence of the magnet on the Hall cell, whereby the motor can function as a gyroscope.

2. A single phase DC brushless gyro motor turn coordinator for aircraft including, in combination:

(a) a frame;

(b) a gimbal mounted to the frame for turning movement about an inclined axis lying in a vertical plane extending in a fore and aft direction;

(c) a gyro rotor mounted in the gimbal for rotation about a transverse horizontal axis normal to the said vertical plane, the rotor including a centrally disposed disc-shaped permanent ceramic rotor magnet of given thickness in an axial direction defining alternate north and south poles about its periphery;

(d) first and second stator windings secured to the frame juxtaposed to diametrically opposite sides of the ceramic rotor magnet;

(e) a DC source for said stator windings;

(f) a sole Hall cell sensor means supported by the frame adjacent to the center peripheral portion of said ceramic rotor magnet, said given thickness being such that the degree of turning of the gimbal in the frame is not sufficient to remove the influence of the rotor magnet on the sensor means; and (g) solid state switching means stationarily mounted relative to the frame and responsive to the sensor means to switch exciting current passed from said source through the stator windings in synchronism with the position of the rotor to thereby drive the rotor continuously in one direction whereby no brushes or slip rings are required.

3. The subject matter of claim 2, including speed regulating means for generating an error signal whenever the speed of the rotor determined by the Hall cell sensor means deviates from a manually set-in adjusted value; and variable impedance means connected between the DC source and stator windings and responsive to the error signal to vary its impedance and thereby change the current in the stator windings in a manner to bring the speed of the motor back to the adjusted value.

4. The subject matter of claim 3, in which said stator windings are bobbin-wound without laminations.

* * * * *